United States Patent
Wanigatunga et al.

(10) Patent No.: US 6,635,195 B1
(45) Date of Patent: Oct. 21, 2003

(54) CATIONIC PHOTOPOLYMERIZATION OF DIEPISULFIDES AND APPLICATION TO THE MANUFACTURE OF OPTICAL LENSES

(75) Inventors: Sirisoma Wanigatunga, Largo, FL (US); Yassin Turshani, Largo, FL (US)

(73) Assignee: Essilor International Compagnie Generale d'Optique, Charenton cedex (FR)

( * ) Notice: Subject to any disclaimer, the term of this patent is extended or adjusted under 35 U.S.C. 154(b) by 0 days.

(21) Appl. No.: 09/499,070

(22) Filed: Feb. 4, 2000

(51) Int. Cl.$^7$ .............. B29D 11/00; C08F 2/46; C08G 75/03
(52) U.S. Cl. .............. 264/1.1; 522/25; 522/27; 522/168; 528/377; 528/378; 528/380; 264/494; 264/496
(58) Field of Search .............. 528/377, 378, 528/380; 522/25, 27, 168; 264/1.1, 494, 496

(56) References Cited

U.S. PATENT DOCUMENTS

| | | | |
|---|---|---|---|
| 4,069,054 A | 1/1978 | Smith | 96/115 P |
| 4,250,053 A | 2/1981 | Smith | 252/426 |
| 5,422,046 A | 6/1995 | Tarshiani et al. | 264/1.38 |
| 5,807,975 A | 9/1998 | Amagani et al. | 528/373 |
| 6,204,311 B1 | 3/2001 | Morijiri et al. | 523/400 |
| 6,534,589 B1 * | 3/2003 | Yoshimura et al. | 524/765 |
| 2001/0047043 A1 * | 11/2001 | Okoroafor et al. | 522/31 |

FOREIGN PATENT DOCUMENTS

| | | |
|---|---|---|
| EP | 0011918 | 6/1980 |
| EP | 0640469 | 3/1995 |
| GB | 2034317 | 6/1980 |
| JP | 11-12273 A * | 1/1999 |
| WO | WO 01/70853 | 9/2001 |

OTHER PUBLICATIONS

Allcock et al., "Contemporary Polymer Chemistry, 2$^{nd}$ Edition", 1990, Prenctice Hall, Engelwood Cliffs, NJ.*

Tsunooka et al., "Photocationic crosslinking of poly(2, 3–epithiopropyl methacrylate) and photo–initiated cationic polymerization of its model compounds," *J. Polymer Sci.*, 22:2217–2225, 1984.

Tsunooka et al., "Photocrosslinking of polymers bearing episulfide groups in the solid phase," *J. Polymer Sci.*, 19:201–204, 1981.

* cited by examiner

*Primary Examiner*—Robert Dawson
*Assistant Examiner*—Marc S Zimmer
(74) *Attorney, Agent, or Firm*—Fulbright & Jaworski L.L.P.

(57) ABSTRACT

A process for polymerizing/curing a photopolymerizable monomer composition comprising at least one diepisulfide monomer which comprises the steps of:

a) mixing to the monomer composition an effective amount of a cationic photopolymerization initiator, and b) irradiating the mixture of a) with an ultraviolet radiation to at least partially cationically photopolymerize the monomer composition.

43 Claims, No Drawings

CATIONIC PHOTOPOLYMERIZATION OF DIEPISULFIDES AND APPLICATION TO THE MANUFACTURE OF OPTICAL LENSES

BACKGROUND OF THE INVENTION

1. Field of the Invention

The present invention concerns in general a process for polymerizing/curing diepisulfides which comprises cationic photopolymerization of diepisulfides and the use of such a process for making optical lens materials, in particular optical lens materials having refractive indices of 1.7 or more.

2. Description of Prior Art

Document U.S. Pat. No. 5,807,975 discloses thermal polymerization and curing of diepisulfides in particular for the manufacture of optical materials such as a lens material for spectacles. This thermal polymerization/curing of diepisulfides lasts for several hours, generally about 20 hours.

Photo-initiated cationic polymerization of monoepisulfides is disclosed in the article "Photocationic crosslinking of poly(2,3-epithiopropyl methacrylate) and Photoinitiated cationic polymerization of its model compounds" M. Tsunooka et al, Journal of Polymer Science: polymer chemistry edition, vol. 22, 2217–2225 (1984). However, the photoinitiators used in the photopolymerization are colored material that are not suitable for making optical lens materials.

Cationic polymerization of diepisulfides to form polymer networks has not been reported. The diepisulfides show different reactivities than monoepisulfides due to the neighboring episulfide functional groups.

It, thus, exists a need for fast processes for polymerizing dicpisulfides and diepisulfide base compositions for the manufacture of lens materials having ultra high refractive indices of 1.7 or more with good optical properties.

SUMMARY OF THE INVENTION

It is an object of the present invention to provide a process for cationic photopolymerization of diepisulfides.

It is another object of the invention to provide a process for making in a relatively short time an optical lens material by cationic photopolymerization of a diepisulfide base composition.

It is still another object of the invention to provide a process for making an optical lens having a refractive index equal to or greater than 1.7.

These and other objects are provided by a process for polymerizing/curing a polymerizable monomer composition including at least one diepisulfide monomer which comprises mixing to the composition an effective amount of at least one cationic photopolymerization initiator (photoinitiator) to obtain a photopolymerizable composition and irradiating the photopolymerizable composition with an UV radiation to at least partially cationically photopolymerize the photopolymerizable composition.

In a preferred embodiment, the process for polymerizing/ curing the photopolymerizable composition comprises first preheating the photopolymerizable composition to a predetermined temperature, irradiating with a UV radiation to cationically partially polymerize the photopolymerizable composition and then heating the partially polymerized composition to a predetermined temperature for a predetermined time to complete polymerization and cure.

It was found that the above process is particularly useful for making plastic lenses of high optical quality, both finished or semi-finished, in a relatively short time.

In particular the above process can be used for making high optical quality lenses which are clear, hard, processable and free of striations.

Thus, the present invention also provides a process for making plastic lenses in particular having a refractive index of 1.7 or more, which comprises the steps of:

a) pouring in a mold a photopolymerizable monomer composition including at least one diepisulfide monomer and at least one cationic photopolymerization initiator;

b) preheating the photopolymerizable monomer composition to a temperature ranging from 50 to 100° C.;

c) irradiating the photopolymerizable monomer composition with a UV radiation to partially polymerize the composition;

d) heating the partially polymerized composition at a temperature ranging from 30 to 100° C. for a predetermined time to complete polymerization; and e) recovering the plastic lens from the mold.

During the UV irradiation step, the polymerization temperature is preferably monitored so that this temperature is kept within a predetermined range. For controlling the exothermic reaction during photopolymerization, the exposure to UV radiation is repeatedly turned on and off as needed to maintain constant the polymerization temperature which in turn results in a uniform polymerization or curing.

DETAILED DESCRIPTION OF THE PREFERRED EMBODIMENTS

According to the invention, the photopolymerizable monomer composition includes at least one diepisulfide monomer.

Suitable diepisulfide monomers are diepisulfides of formula:

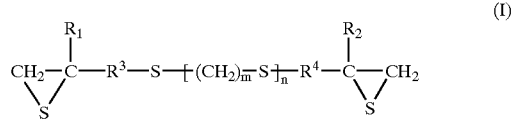
(I)

in which $R^1$ and $R^2$ are, independently from each other, H, alkyl, aryl, alkoxy, aryloxy, alkylthio or arylthio; $R^3$ and $R^4$ are, independently from each other,

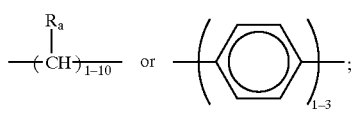

$R_a$ designates H, alkyl, aryl, alkoxy, aryloxy, alkylthio or arylthio and, n is an integer from 0 to 4 and m is an integer from 0 to 6.

A preferred class of diepisulfides is comprised of diepisulfides of formula:

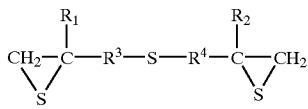
(I')

in which $R^1$, $R^2$, $R^3$ and $R^4$ are defined as above.

Another preferred class of diepisulfides is comprised of diepisulfides of formula:

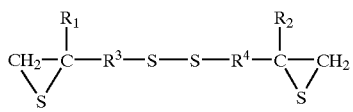
(I")

in which $R^1$, $R^2$, $R^3$ and $R^4$ are defined as above.

In $R^1$, $R^2$, $R^3$ and $R^4$ the alkyl and alkoxy groups are preferably $C_1$–$C_6$, more preferably $C_1$–$C_4$ alkyl and alkoxy groups such as methyl, ethyl, propyl, butyl, methoxy, ethoxy, propoxy and butoxy.

preferred diepisulfides are those of formula:

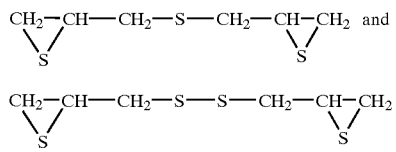
(IA) and (IB)

The photopolymerizable monomer compositions also include at least one cationic photoinitiator for cationic photopolymerization of the monomers of the composition.

Any cationic photoinitiator can be used in the photopolymerizable composition of the invention, but preferably the photoinitiator shall not color the resulting photopolymerized material.

Among the preferred photoinitiators, there may be cited the compounds of formula:

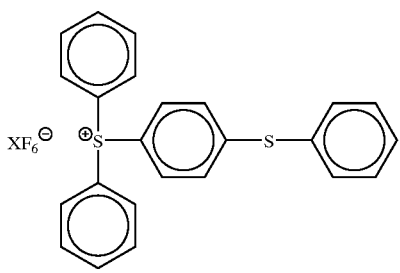
(II)

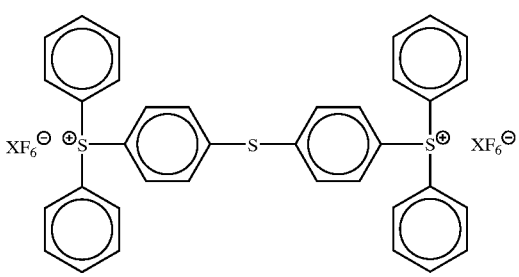
(III)

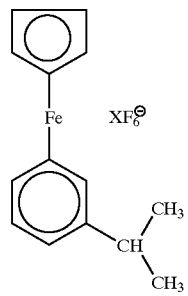
(IV)

where X is Sb or P,

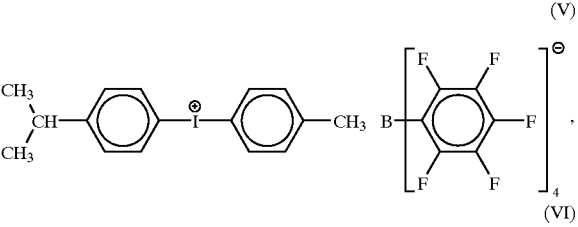
(V)

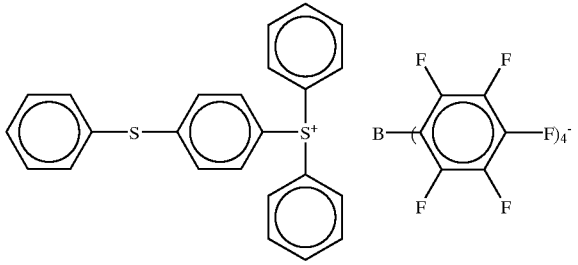
(VI)

and mixtures thereof.

Cationic photoiniators are commercialy available under the tradenames of RHODORSIL® 2074 (compound of formula V), Irgacure® 261 (compound of formula IV), CYRACURE® (mixed triarylsulfoniumhexafluoroantimonate salts and mixed triarylsulfoniumhexafluorophosphate salts of formulac I and III), SATCAT® (mixed triarylsulfoniun and iodonium salts) and TTAS (compound of formula VI).

In general, the photoinitiator is used in an amount of 0.005 to 5% by weight based on the total weight of the polymerizable monomers of the composition and preferably in an amount of 0.25 to 1% by weight.

The photopolymerizable compositions of the invention may include a photosensitizer. Any known photosensitizer may be used in the composition of the invention.

Among usual photosensitizers, there may be cited alkoxyacetophenones, benzoinethers, phosphine-oxides, benzoyloximes, benzophenones, benzyls, xanthones, anthrones, thioxantones, fluorenones, suberones, acridones and anthracene.

Such kind of photosensitizers are known in the art and described in particular in US patents U.S. Pat. No. 4,026,705; U.S. Pat. No. 4,069,054 and U.S. Pat. No. 4,250,053.

Preferred photosensitizers are selected from the group consisting of:

a) aromatic tertiary amines having the formula:

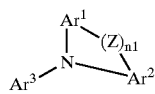

where $Ar^1$, $Ar^2$ and $Ar^3$ are aromatic groups having 6 to 20 carbon atoms; Z is selected from oxygen, sulfur,

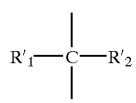

a carbon to carbon bond; or

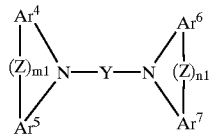

where $R'_1$ and $R'_2$ are selected from hydrogen, alkyl radicals of 1 to 4 carbon atoms and alkenyl radicals of 2 to 4 carbon atoms and wherein $n_1$ is zero or 1;

b) aromatic teriary diamines having the formula:

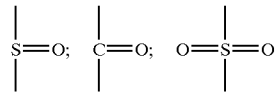

where Y is a divalent radical selected from arylene and $Ar^8$—Z—$Ar^9$, where Z is as described above; $Ar^4$, $Ar^5$, $Ar^6$, $Ar^7$, $Ar^8$ and $Ar^9$ are aromatic groups having 6 to 20 carbon atoms; and wherein $n_1$ and $m_1$ are zero or 1; and;

c) aromatic polycyclic compounds having at least three fused benzene rings and further having an ionization energy less than about 7.5 cV.

d) fluorescent polyaryl compounds selected from the group consisting of polyarylenes, polyarylpolyens 2,5-diphenylisobenzofurans, 2,5-diarylfurans, 2,5-diarylthiofurans, 2,5-diarylpyroles, 2,5-diarylcyclopentadienes, polyarylphenylenes, cournarins, and polyaryl-2-pyrazolines.

Most preferred photosensitizers are anthracene, 9-methylanthracene, 7-dimethylamino-4-trifluoromethylcoumarin, acetone, perylene, 1,5-diphenyl-3-styryl-2-pyrazoline, 1-phenyl-3-(p-methoxy-styryl)-5-(p-methoxyphenyl-1,2-pyrazoline), isopropylthioxanthone.

The amount of photosensitizer in the photopolymerizable composition is classical and ranges generally from 0.005 to 1% by weight of total weight of photopolymerizable monomers.

The photopolymerizable monomer compositions of the invention may comprise solely as polymerizable monomers one or more of the above defined diepisulfides. However, as will be indicated later, the photopolymerizable monomer compositions may also include other polymerizable monomers different from the diepisulfides.

These monomers are compounds having two or more functional groups capable of reacting with an episulfide group or compounds having one or more of these functional groups and one or more of other homopolymerizable groups.

These additional monomers include epoxy compounds, polythiols, unsaturated ethylenic compounds such as vinyl ether or (methy)acrylate compounds, polyvalent carboxylic acids and anhydrides, thiocarboxylic acids, thio alcohols, thiophenols, polyphenols, amines and amides.

Preferred additional monomers are epoxy compounds polythiol, acrylate and (meth)acrylate compounds.

Among the preferred epoxy compounds there may be cited the compounds of formula:

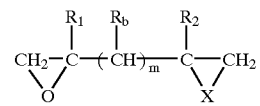

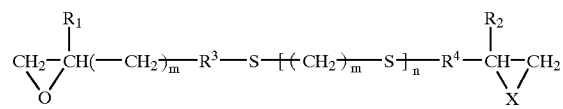

where X is O or S, $R^b$ is H, alkyl or aryl and preferably alkyl or aryl, and $R^1$, $R^2$, $R^3$, $R^4$, m and n are defined as above.

Typical examples of the unsaturated ethylenic compounds include ethylene glycol dimethacrylate, propylene glycol dimethacrylate, trimethylene glycol dimethacrylate, tetramethylene glycol dimethacrylate, polyethylene glycol dimethacrylate, trimethylolpropane triacrylate, pentaerythritolpropane trimethacrylate, ethoxylated bisphenol A diacrylate, 1,6-hexanediol dimethacrylate, urethane diacrylate, epoxy diacrylate, dially phthalate, and divinyl benzene.

Examples of polythiol compounds include 1,2,3-trimethylolpropane tri(thioglycolate), pentaerythritol tetra (thio-glycolate), pentaerythritol tetra(3-mercaptopropionate), 1,2,3-trimethylolpropane tri(3-mercaptopropionate), thioglycerol, dithioglycerol, trithioglycerol, dipentaerythritol hexa (2-mercapto acetate), and 3,4,5,6-tetrachloro-1,2-dimercapto benzene.

Among the (meth)acrylate compounds, there may be cited alkyl ($C_1$–$C_6$) (meth)acrylate such as methyl(meth)acrylate, ethyl (meth)acrylate, propyl(meth)acrylate and butyl(meth) acrylate The additional monomers usually represents 0 to 80% by weight, preferably 0 to 50% by weight, of the total weight of polymerizable monomers present in the composition.

The photopolymerizable composition may also include other optional ingredients classically used in the formulation of polymerizable compositions such as mold release agents, antioxidants, dyes and UV light absorbers. These and other ingredients may be employed in their customary amounts for their customary purposes.

Diluents or solvents may also be added to adjust the viscosity of the polymerizable composition.

The preferred solvents are dimethylsulfoxide (DMSO), dimethylfornamide (DMF), acetonitrile and tributylphosphate (TBP).

The process of the invention includes a step of partially polymerizing the photopolymerizable composition by irradiating the composition with an UV radiation.

The ultraviolet radiation used in the photopolymenization step can be selected from any suitable source, including low, medium or high pressure mercury lamps, laser, xenon, luminescence such as fluorescence or phosphorescence, and the like. The irradiation intensity may vary from 5 mW/cm$^2$ to 350 mW/cm$^2$ depending upon the photopolymerizable composition and the desired degree of photopolymenization.

As previously indicated, the temperature of the exothermic photopolymerization reaction is preferably monitored by turning on and off the irradiation in order to keep the reaction temperature within a predetermined range. This temperature range usually varies from 30° C. to 100° C. typically 60–80° C.

Monitoring of photopolymerization of a composition is disclosed in U.S. Pat. No. 5,422,046.

The following examples illustrate the present invention.

In the examples unless otherwise indicated all parts and percentages are by weight.

EXAMPLES 1 TO 8

Diepisulfide of formula IA was mixed at 15° C. with Cyracure 6974 in the proportions indicated in Table I. The mixture was degrassed and injected into a 1mm thick finished single vision lens mold with a rubber gasket. The mold assembly was heated to 60° C. and then subjected to an on/off irradiation with UV light as indicated in table I. The mold assembly was then heated as indicated in Table I for completion of polymerization.

TABLE I

|  | EX 1 | EX 2 | EX 3 | EX 4 | EX 5 | EX 6 | EX 7 | EX 8 |
|---|---|---|---|---|---|---|---|---|
| Composition |  |  |  |  |  |  |  |  |
| Diepisulfide IA (g) | 9.8 | 9.9 | 9.9 | 9.8 | 9.8 | 9.9 | 9.925 | 9.95 |
| Cyracure ® 6974 (g) | 0.2 | 0.1 | 0.1 | 0.2 | 0.2 | 0.1 | 0.075 | 0.05 |
| Preheating |  |  |  |  |  |  |  |  |
| Temperature ° C. | 60 | 60 | 60 | 60 | 60 | 80 | 80 | 80 |
| Irradiation with UV light |  |  |  |  |  |  |  |  |
| Intensity mW/cm$^2$ | 200 | 330 | 320 | 150 | 200 | 100 | 100 | 100 |
| Duration of irradiation (shots) | 30/30/30/15 | 45/15/15 | 45/30/30 | 30/30/30/30 | 45/30/30/15 | 27/10/10/17/17 | 27 | 48/13/17/45 |
| Time between shots (minutes) | 1 | 1 | 1 | 1 | 1 | 1 | 1 | 1 |
| Final heating |  |  |  |  |  |  |  |  |
| Temperature ° C. | 100 | 100 | 100 | 100 | 100 | 100 | 100 | 100 |
| Time (hours) | 3 | 3 | 2.5 | 3 | 3 | 3 | 3 | 3 |

Preferably, the process of the invention includes a step of preheating the polymerizable composition. Preheating can be carried out by using a water bath, vat, IR-radiation or by an air-oven.

The most preferred process of the invention includes preheating the composition generally at a temperature of 50° C. to 100° C., typically 60° C. to 80° C., before the partial photopolymerization step and completion of polymerization by heating to a temperature of 30° C. to 100° C., preferably of 60° C. to 80° C.

The partial photopolymerization step may comprise a single pre-polymerization step resulting in the obtention of a gel or a first pre-polymerization step for forming a gel and a second polymerization step for increasing the polymerization rate beyond the mere obtention of a gel.

Subsequent to partial polymerization by radiation, the final step of the process involves a thermal heating to complete the polymerization. This is done either in an oven or using an IR source.

This heating step generally lasts for 1 to 5 hours in order to achieve complete polymerization, and typically is of 3 hours.

The process of the invention is advantageous for making plastic lenses having refractive indices as high as 1.7 or greater.

It can be implemented using classical two part glass molds.

When using the preferred process including preheating step and final heating step, the resulting lenses do not exhibit striations.

EXAMPLES 9 TO 12

Photopolymerizable compositions were prepared as in the previous examples using diepisulfide of formula IB and Cyracure® 6974 in the amounts indicated in Table II. The mold assembly was preheated to 60° C. prior to irradiation. Irradiation conditions with UV light are given in Table II. After irradiation with UV lights, the mold assembly was heated at 100° C. for 3 hours.

TABLE II

|  | EX9 | EX10 | EX11 | EX12 |
|---|---|---|---|---|
| Composition |  |  |  |  |
| Diepisulfide IB (g) | 9.9 | 9.9 | 9.9 | 9.9 |
| Cyracure ®6974 (g) | 0.1 | 0.075 | 0.5 | 0.25 |
| Preheating |  |  |  |  |
| Temperature ° C. | 60 | 60 | 60 | 60 |
| Irradiation with UV light |  |  |  |  |
| Intensity mW/cm$^2$ | 125 | 125 | 125 | 125 |
| Duration of exposure (s) | 30 | 60 | 60 | 60 |
| Final heating |  |  |  |  |
| Temperature ° C. | 100 | 100 | 100 | 100 |
| Time (hours) | 3 | 3 | 3 | 3 |

CYRACURE ®6974: mixture of compounds of formulae II and III
X = Sb

EXAMPLES 13 AND 14

Photopolymerizable compositions having the fomulations given in Table III were degassed for I minute at 60° C. and poured in a mould as in the previous example.

The internal walls of the mould were coated with a layer of a a standard external mould release agent.

The compositions were then polymerized according to the present process and as specified in Table III.

Release property (demoulding), cracking, light transmission and Barcol values of the resulting lenses are also given in Table III.

TABLE III

|  | EX. 13 | EX. 14 |
| --- | --- | --- |
| Composition |  |  |
| *Diepisulfide IA(g) | — | 19.8 |
| *Diepisulfide IB (g) | 14.835 | — |
| *Cyracure ® 6974(g) | 0.075 | 0.2 |
| *Blue dye solution 426 (g) | 0.09 | — |
| Preheating |  |  |
| *Infrared heater |  |  |
| *Temperature (° C.)/duration (mn) | 60/5 | 80/5 |
| Irradiation with UV light |  |  |
| *UV intensity (mW/cm$^2$) | 40 | 40 |
| Prepolymerization to gel |  |  |
| *Number of shots | 1 | 3 |
| *Duration of shots (s) | 45 | 60/60/15 |
| *Temperature reached (° C.) | 60–70 | 80–90 |
| Further polymerization | For 5 minutes with 15–30 s shots and 20–30 time intervals to maintain 60–70° C. temperature | — |
| Final heating |  |  |
| *Temperature (° C.) | 75 | 80 |
| *Duration (hours) | 1 | 3 |
| Properties of moulded lens |  |  |
| *Mold release | good | good |
| *Cracking | no | no |
| *Light Transmission | 83.4 | 83.3 |
| *Barcol Hardness value | 79.61 | — |
| *Refractive index | 1.7 | 1.73 |

Acceptable Barcol hardness value range is 72–90.

The Barcol hardness of the lens is measured by using a Barcol impressor according to ASTM D 2583-93, being precised that the instrument is first calibrated with a standard test metal disc.

An uncoated lens specimen is placed at 23±5° C. temperature and 50±5° RH for 8 hours and placed under the indentor.

The average of three readings are taken as the final Barcol value.

What is claimed is:

1. A process for polymerizing/curing a monomer composition comprising at least one diepisulfide monomer which comprises the steps of:
    a) mixing to the monomer composition an effective amount of a cationic photopolymerization initiator,
    b) preheating the mixture to a temperature ranging from 50° C. to 100° C.;
    c) irradiating the preheated mixture to partially polymerize the monomer composition; and
    d) heating the partially polymerized monomer composition at a temperature ranging from 30° C. to 100° C. for 1 to 5 hours to complete polymerization of the monomer composition.

2. The process of claim 1, wherein irradiation with ultraviolet radiation comprises switching on and off ultraviolet radiation application for maintaining polymerization temperature within a predetermined range.

3. The process of claim 2, wherein the predetermined range of polymerization temperature is 30° C. to 100° C.

4. The process of claim 1, wherein the diepisulfide monomer is selected from diepisulfides of formula:

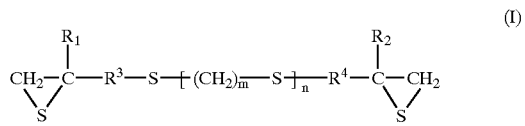

(I)

in which $R^1$ and $R^2$ are, independently from each other, H, alkyl, aryl, alkoxy, aryloxy, alkylthio or arylthio; $R^3$ and $R^4$ are, independently from each other,

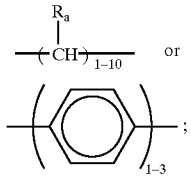

n is an integer from 0 to 4 and m is an integer from 0 to 6 and $R_a$ designates H, alkyl, aryl, alkoxy, aryloxy, alkylthio or arylthio.

5. The process of claim 4, wherein the diepisulfide has formula:

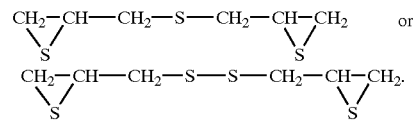

6. The process of claim 1, wherein, the photoinitiator is selected from the group consisting of:

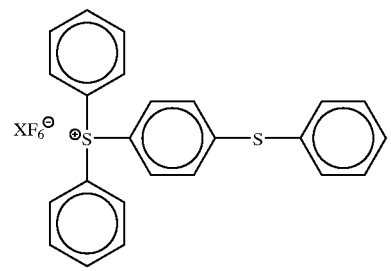

(II)

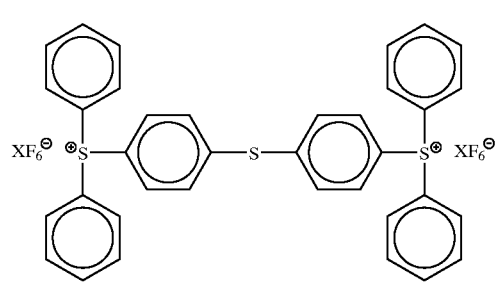

(III)

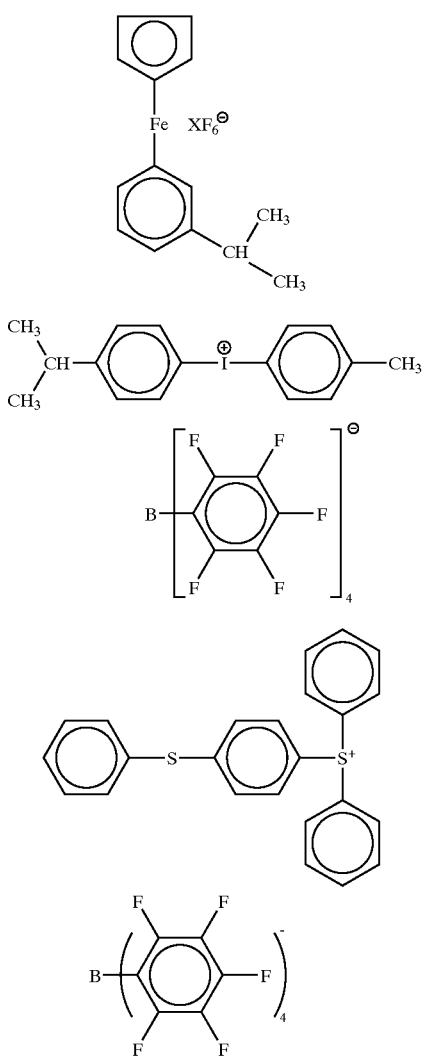

where X is Sb or P, and mixtures.

7. The process of claim 1, wherein the photoiniator is used in an amount ranging from 0.005 to 5% by weight based on the total weight of diepisulfides.

8. The process of claim 7, wherein the amount of photoiniator used ranges from 0.25 to 1% by weight.

9. The process of claim 1, wherein monomer composition further comprises an effective amount of at least one photosensitizer.

10. The process of claim 9, wherein the photosensitizer is selected from the group consisting of anthracene, 9-methyl anthracene, 7-dimethylamino 4-trifluoromethylcoumarin, acetone, perylene, 1,5-diphenyl-3-styryl-2-pyrazoline, 1-phenyl-3-(p-methoxy-styryl)-5-(p-methoxyphenyl-1,2-pyrazoline), isopropylthioxanthone.

11. The process of claim 9, wherein the effective amount of photosensitizer ranges from 0.005 to 1% by weight based on the total weight of diepisulfides.

12. The process of claim 1, wherein the monomer composition comprises as polymerizable monomer only a diepisulfide monomer or a mixture of diepisulfide monomers.

13. The process of claim 1, wherein the monomer composition comprises at least one additional monomer having two or more functional groups capable of reacting with an episulfide group, or a monomer having one or more of these functional groups and one or more of other homopolymerizable groups.

14. The process of claim 13, wherein the additional monomer is selected from unsaturated ethylenic compounds, epoxy compounds, polythiols, sulfur containing epoxy compounds, polyvalent carboxylic acids, polyvalent carboxylic anhydrides, thiocarboxylic acids, thio alcohols, thiophenols, polyphenols, amines and amides.

15. The process of claim 13, Wherein the additional monomer is selected from epoxy compound, polythiols, acrylate and methacrylate compounds.

16. The process of claim 13, wherein the amount of additional monomer in the composition ranges from 0 to 80% by weight of the total weight of monomers.

17. The process of claim 1, wherein the monomer composition further comprises one or more adjuvants selected from UV light absorbers, mold release agents, antioxidants and dyes.

18. The process of claim 1, wherein the monomer compositions further comprise at least one solvent.

19. The process of claim 18, wherein the solvent is selected from dimethylsulfoxide, dimethylformamide, acetonitrite, and tributylphosphate (TBP).

20. A process for making a plastic lens comprising the steps of:
   a) pouring in a mold a photopolymerizable monomer composition including at least one diepisulfide monomer and at least one cationic photopolymerization initiator;
   b) preheating the photopolymerizable monomer composition to a temperature ranging from 50° C. to 100° C.;
   c) irradiating the photopolymerizable monomer composition with a UV radiation to partially polymerize the composition;
   d) heating the partially polymerized composition at a temperature ranging from 30° C. to 100° C. for a predetermined time to complete polymerization; and
   e) recovering the plastic lens from the mold.

21. The process of claim 20, wherein irradiation with ultraviolet radiation comprise switching on and off ultraviolet radiation application for maintaining polymerization temperature within a predetermined range.

22. The process of claim 21, wherein the predetermined range of polymerization temperature is 30 to 100° C.

23. The process of claim 20, wherein the diepisulfide monomer is selected from diepisulfides of formula:

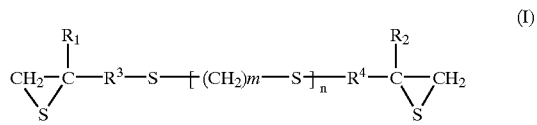

in which $R^1$ and $R^2$ are, independently from each other, H, alkyl, aryl, alkoxy, aryloxy, alkylthio or arylthio; $R^3$ and $R^4$ are, independently from each other,

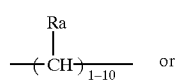

or

-continued

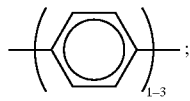

n is an integer from 0 to 4 and m is an integer from 0 to 6, and $R_a$ designates H, alkyl, aryl, alkoxy, aryloxy, alkylthio or arylthio.

24. The process of claim 23, wherein the diepisulfide has formula:

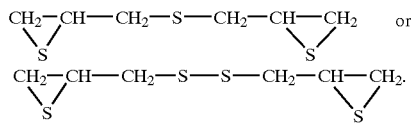

25. The process of claim 20, wherein the photoinitiator is selected from the group consisting of:

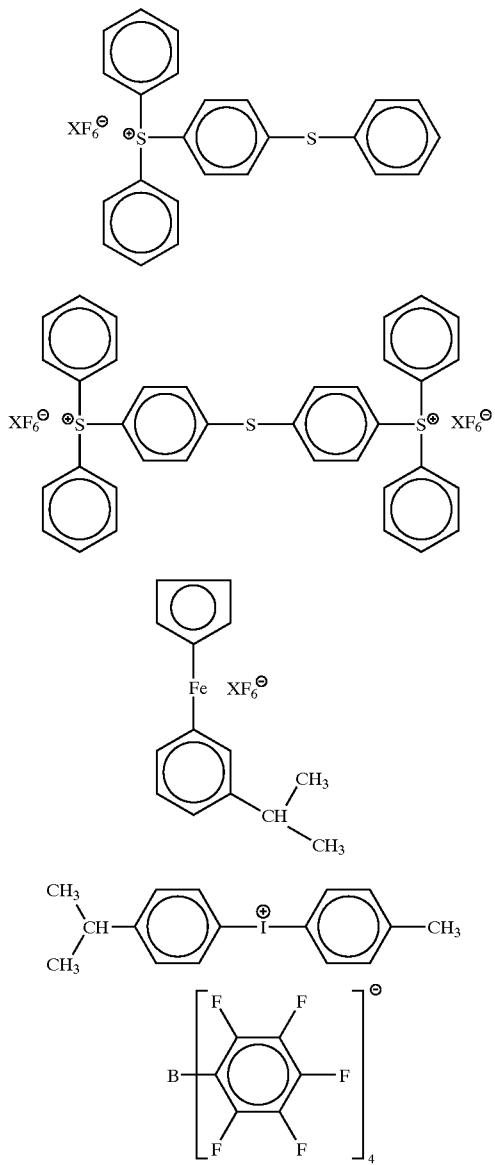

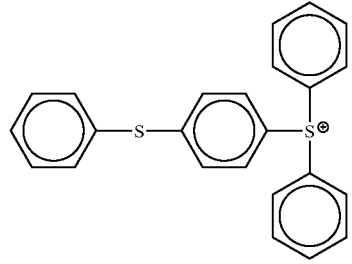

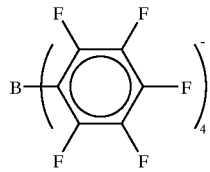

where X is Sb or P, and mixtures.

26. The process of claim 20, wherein the photoinitiator is used in amount ranging from 0.005 to 5% by weight based on the total weight of diepisulfides.

27. The process of claim 26, wherein the amount of photoinitiator used ranges from 0.25 to 1% by weight.

28. The process of claim 20, wherein monomer composition further comprises an effective amount of at least one photosensitizer.

29. The process of claim 28, wherein the photosensitizer is selected from the group consisting of anthracene, 9-methyl anthracene, 7-dimethylamino 4-trifluoromethylcoumarin, acetone, perylene, 1,5-diphenyl-3-styryl-2-pyrazoline, 1-phenyl-3-(p-methoxy-styryl)-5-(p-methoxyphenyl-1,2-pyrazoline), isopropylthioxanthone.

30. The process of claim 28, wherein the effective amount of shots sensitizer ranges from 0.005 to 1% by weight based on the total weight of diepisulfides.

31. The process of claim 20, wherein the monomer composition comprises as polymerizable monomer only a diepisulfide monomer or a mixture of diepisulfide monomers.

32. The process of claim 20, wherein the monomer composition comprises at least one additional monomer having two or more functional groups capable of reacting with an episulfide group, or a monomer having one or more of these functional groups and one or more of other homopolymerizable groups.

33. The process of claim 32, wherein the additional monomer is selected from unsaturated ethylenic compounds, epoxy compounds, polythiols, sulfur containing epoxy compounds, polyvalent carboxylic acids, polyvalent carboxylic anhydrides, thiocarboxylic acids, thio alcohols, thiophenols, polyphenols, amines and amides.

34. The process of claim 32, wherein the additional monomer is selected from epoxy compound, polythiols, acrylate and methacrylate compounds.

35. The process of claim 32, wherein the amount of additional monomer in the composition ranges from 0 to 80% by weight of the total weight of monomers.

36. The process of claim 20, wherein the monomer composition further comprises one or more adjuvants selected from UV light absorbers, mold release agents, antioxidants and dyes.

37. The process of claim 20, wherein the monomer compositions further comprise at least one solvent.

38. The process of claim 37, wherein the solvent is selected from dimethylsulfoxide, dimethylformamide, acetonitrite, thioxanthane, and tributylphosphate (TBP).

39. The process of claim 20, wherein the recovered plastic lens has a refractive index of at least 1.7.

40. A process for polymerizing/curing a photopolymerizable monomer composition comprising at least one diepisulfide monomer and at least one solvent which comprises the steps of:
   (a) mixing to the monomer composition an effective amount of a cationic photopolymerization initiator, and
   (b) irradiating the mixture of (a) with an ultraviolet radiation to at least partially cationically photopolymerize the monomer composition.

41. The process of claim 40, wherein the solvent is selected from dimethylsulfoxide, dimethylformamide, acetonitrite, thioxanthane, and tributylphosphate (TBP).

42. A process for polymerizing/curing a photopolymerizable monomer composition comprising at least one diepisulfide monomer and at least one solvent which comprises the steps of:
   (a) mixing to the monomer composition an effective amount of a cationic photopolymerization initiator, and
   (b) irradiating the mixture of (a) with an ultraviolet radiation to at least partially cationically photopolymerize the monomer composition,
   wherein the diepisulfide monomer is selected from diepisulfides of formula:

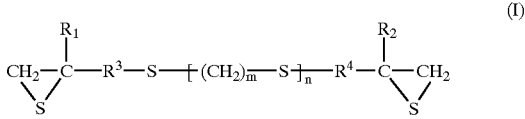

in which $R^1$ and $R^2$ are, independently from each other, H, alkyl, aryl, alkoxy, aryloxy, alkylthio or arylthio; $R^3$ and $R^4$ are, independently from each other,

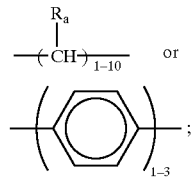

n is an integer from 0 to 4 and m is an integer from 0 to 6, and $R_a$ designates H, alkyl, aryl, alkoxy, aryloxy, alkylthio or arylthio.

43. The process of claim 42, wherein the solvent is selected from dimethysulfoxide, dimethylformamide, acetonitrite, thioxanthane, and tributylphosphate (TBP).

* * * * *

UNITED STATES PATENT AND TRADEMARK OFFICE
CERTIFICATE OF CORRECTION

PATENT NO.    : 6,635,195 B1
DATED         : October 21, 2003
INVENTOR(S)   : Wanigatunga et al.

It is certified that error appears in the above-identified patent and that said Letters Patent is hereby corrected as shown below:

<u>Column 10,</u>
Line 57, before "isopropylthioxanthone", insert -- and --.

<u>Column 11,</u>
Line 44, after "mixture", insert -- thereof --.

<u>Column 12,</u>
Line 11, delete "Wherein" and insert -- wherein --.

<u>Column 14,</u>
Line 34, before "isopropylthioxanthone", insert -- and --.

Signed and Sealed this

Twenty-third Day of March, 2004

JON W. DUDAS
*Acting Director of the United States Patent and Trademark Office*